UNITED STATES PATENT OFFICE.

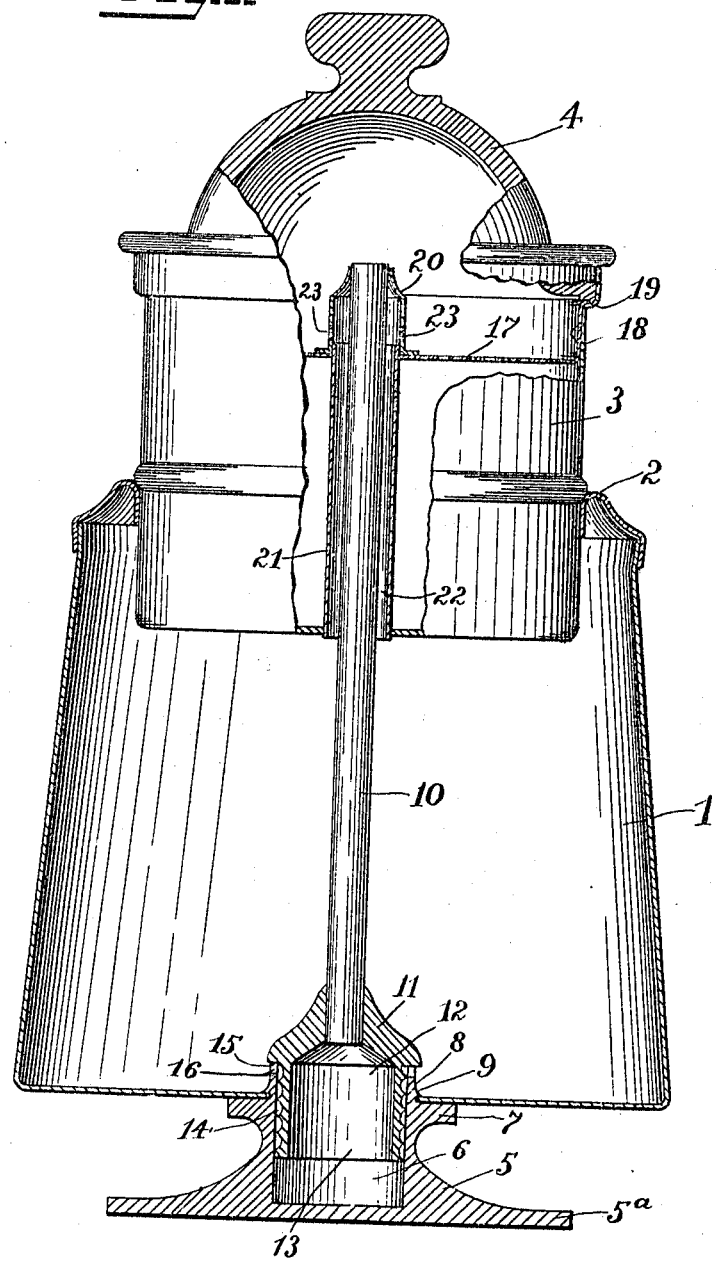

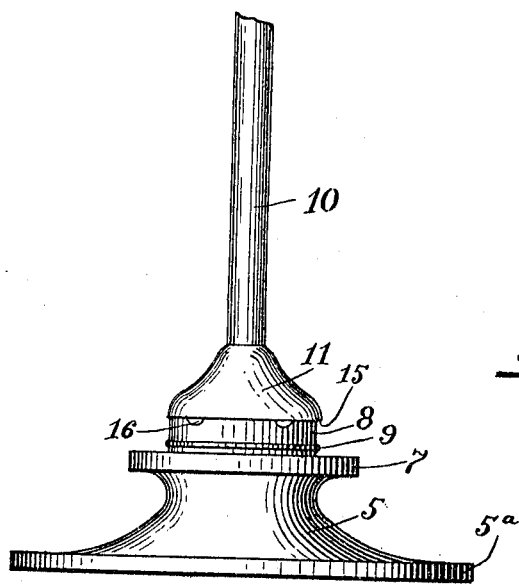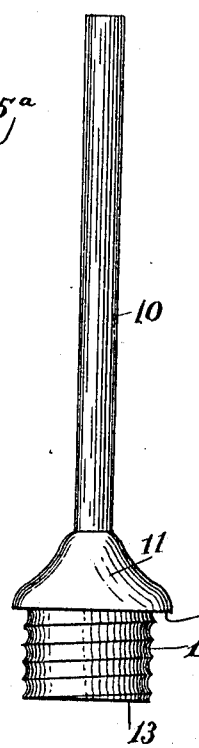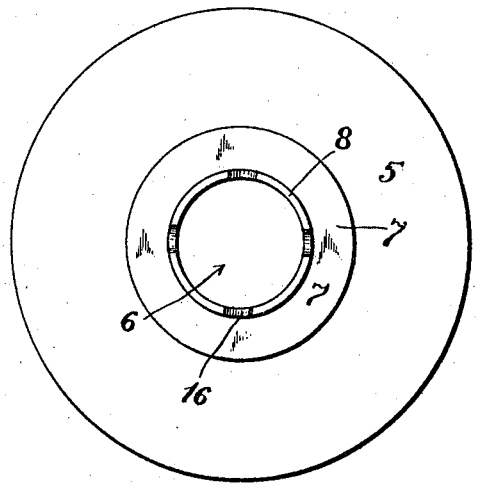

JAMES W. CHAPMAN, OF MERIDEN, CONNECTICUT, ASSIGNOR TO MANNING BOWMAN & COMPANY, OF MERIDEN, CONNECTICUT, A CORPORATION OF CONNECTICUT.

PERCOLATING DEVICE.

953,001.    Specification of Letters Patent.    Patented Mar. 22, 1910.

Application filed July 8, 1909. Serial No. 506,469.

*To all whom it may concern:*

Be it known that I, JAMES W. CHAPMAN, a citizen of the United States, residing at Meriden, county of New Haven, State of Connecticut, have invented certain new and useful Improvements in Percolating Devices, of which the following is a full, clear, and exact description.

My invention relates to improvements in so-called percolator coffee pots and particularly to the means for admitting the liquid from the main body of the pot to the heating chamber, although the invention may be said to relate to the percolating mechanism generally.

The object of the invention is to provide a passage for the liquid from the main body of the pot to the heating chamber of such character as to insure prevention of a back flow of the liquid to the main body of the pot due to pressure in the heating chamber.

A further object is to so arrange this passage as to secure heating of the liquid during transit to the heating chamber as well as in the heating chamber.

A further object is to provide such percolating means in combination with improved means for increasing the heat capacity of the heating chamber.

A further object is to provide a safety overflow in the coffee container which shall prevent the level of the liquid from rising high enough in such container to overflow to the outside thereof.

A further object is to provide a percolating apparatus consisting of the fewest number of parts and of the simplest possible arrangement consistent with effective operation which parts may be readily separated and easily cleaned.

With these objects in view the invention consists in the construction and arrangement of parts a preferred embodiment of which is illustrated in the accompanying drawings, in which, Figure 1 is a vertical section of a pot embodying my improvements, the container being partly broken away for clear illustration. Fig. 2 is a view in elevation of the percolating tube and heating chamber detached from the pot. Fig. 3 is a plan view of the heating chamber detached from the pot, the percolating tube being removed. Fig. 4 is a detached view of the percolating tube.

In the embodiment of my invention herein selected for illustration, the device comprises in general the main pot or vessel 1 having a reduced opening 2 into which a coffee container 3 is fitted and supported in the usual manner, said container having also a cover 4 of glass or other suitable material fitted thereto.

To the bottom of the main body or chamber is appended a preferably solid metal disk-like member 5 having formed therein a chamber 6 which constitutes the heating chamber of the percolator. The disk-like base 5ª of said member forms a support and heat conducting plate for the pot. The member 5 is provided with an upper flange 7 adapted to engage the under side of the bottom of the pot and also with a boss 8 having an annular rim 9 which may be swaged down upon the inner side of the bottom of the pot when said parts are assembled which rim 9 may be so secured to the bottom of the pot as to effectually prevent leakage.

While I have herein described and shown one means for attaching the heating chamber to the pot, it is to be understood that my invention is not limited thereto.

10 represents the usual percolating tube which as here shown is provided with an enlargement 11 on its lower end, the latter being made hollow to provide a chamber 12 which in conjunction with the chamber 6 forms the complete heating chamber of the percolator. The outer wall of the enlargement 11 forms a depending tubular portion 13 which is made of sufficiently heavy stock to take a comparatively large spiral thread or groove 14, said enlargement having a shoulder 15 which rests upon the top of the boss 8 when the tube is in position. The groove 14 extends preferably spirally from the shoulder 15 to the bottom of said tubular portion 13, thereby in conjunction with openings 16 in the upper end of the boss 8 forming a tortuous passage to conduct liquid from the main chamber or pot 1 to the heating chamber 6. It will be noted that this tortuous or spiral passage 14 is open to the side walls of the heating chamber 6 and in fact the passages are formed by the groove 14 in conjunction with said side walls. By this construction all of the heat imparted to the member 5 from the source of heat is transmitted directly through the side walls of said member 5 to the liquid in the passage 14 whereby the liquid is heated to a great extent during transit from the main body of the pot to the heating chamber 6 where it is still further heated in the usual manner from the bottom. Thus is caused the well known percolating action by which the liquid is forced up through the tube 10 and flows over the coffee in the coffee container 3.

By the construction of the tortuous passage 14 above described, it will be noted that the same forms substantially a water jacket around the inner walls of the heating chamber, whereby the liquid in said passage is exposed to the greatest possible area of heating surface. This, as found by experiment, greatly increases and accelerates the percolating capacity of the pot. By this construction, furthermore, the use of valves in the passage between the main body and the heating chamber is entirely eliminated, while at the same time the tortuous nature of the passage 14 effectually prevents back flow of the liquid from the heating chamber into the main body. This construction is further of advantage in that upon removing the percolating tube from the heating chamber all portions of both of said parts are entirely exposed and easily accessible for thorough cleaning.

The coffee container is provided with a retainer adapted to overlie the coffee and consisting of a perforated disk 17 having an upwardly and outwardly turned flange 18 which rests upon and is supported by a shoulder 19 in the wall of the container. This retainer 17 is provided with a short tubular portion 20 which when the retainer is in place fits over a sleeve 21 secured to and projecting upwardly from the bottom of the coffee container, while at its upper end said tubular portion 20 fits closely about the upper end of the percolating tube 10.

As will be seen from an inspection of Fig. 1, the sleeve 21 of the coffee container is of considerably greater diameter than the percolating tube thereby leaving an annular passage 22 between said tube and sleeve; and the tubular projection 20 of the retainer is provided with suitable apertures 23 which open into said annular passage 22. By this construction, should the speed of percolation be sufficient to cause the liquid to rise above the retainer 17, such excess of liquid will overflow through the apertures 23 and return to the pot through the annular passage 22 whereby overflow of such liquid to the outside of the pot will be prevented.

While I have herein described a preferred form of my invention, it is to be understood that the same may be varied in detail and relative arrangement of parts without departing from the spirit or scope thereof.

What I claim is:

1. A percolator pot comprising a main chamber, a heating chamber, a percolator tube fitting into said chamber, and means between the outer wall of the lower end of said tube and the inner wall of said heating chamber providing a tortuous passage between said main and heating chambers.

2. In a percolator pot, a main chamber, a heating chamber, a percolator tube fitting into said heating chamber, the outer wall of the lower end of said tube being so constructed as to form with the inner wall of said heating chamber a tortuous passage between said main and heating chambers.

3. In a percolator pot, a main chamber, a heating chamber, a percolator tube having an enlarged lower end fitting into said heating chamber, a tortuous groove formed in the outer wall of said enlarged end and forming with the inner wall of the heating chamber a tortuous passage between said main and heating chambers.

4. In a percolator pot, a main chamber, a heating chamber appended thereto, a percolator tube having an enlargement at its lower end adapted to fit into said heating chamber, said enlargement having a spiral groove in its outer wall arranged to form with the inner wall of said heating chamber a tortuous passage from said main chamber to said heating chamber.

5. In a percolator pot, a main chamber, a heating chamber appended thereto, a percolator tube having an enlargement at its lower end adapted to fit into said heating chamber, said enlargement having a tortuous passage formed in its outer wall to afford communication between said main and heating chambers, and having a recess forming a part of said heating chamber.

6. In a percolator pot, a main chamber, a heating chamber appended thereto, a percolator tube having an enlargement on its lower end arranged to fit into said heating chamber, said enlargement having a tortuous groove formed on its outer wall arranged to form a communicating passage between said main and heating chambers in conjunction with the inner wall of said heating chamber.

JAMES W. CHAPMAN.

Witnesses:
A. L. STETSON,
GEO. R. DIMOCK.